US005607990A

United States Patent [19]
Dorn et al.

[11] Patent Number: 5,607,990
[45] Date of Patent: Mar. 4, 1997

[54] METHOD FOR MAKING PHENOL-FORMALDEHYDE RESINS FLAME-RESISTANT

[75] Inventors: Karlheinz Dorn, Budenheim; Klaus Frankenfeld, Hünfelden; Hans-Dieter Nägerl, Dudenhofen; Klaus Sommer, Bad Dürkheim, all of Germany

[73] Assignee: Chemische Fabrik Budenheim Rudolf A. Oetker, Budenheim, Germany

[21] Appl. No.: 211,432

[22] PCT Filed: Oct. 8, 1992

[86] PCT No.: PCT/EP92/02320

§ 371 Date: Jul. 11, 1994

§ 102(e) Date: Jul. 11, 1994

[87] PCT Pub. No.: WO93/07192

PCT Pub. Date: Apr. 15, 1993

[30] Foreign Application Priority Data

Oct. 11, 1991 [DE] Germany ............... 41 33 753.0

[51] Int. Cl.⁶ ............... C08K 5/49; C08G 8/28

[52] U.S. Cl. ............... 524/115; 525/480; 525/485; 525/506; 525/534; 525/538; 524/81; 524/123; 524/442

[58] Field of Search ............... 525/480, 485, 525/506, 534, 538; 524/81, 115, 123, 442

[56] References Cited

U.S. PATENT DOCUMENTS 5,162,394 10/1992 Trocino et al. ............... 523/308

FOREIGN PATENT DOCUMENTS 61-036334 7/1984 Japan.

*Primary Examiner*—Samuel A. Acquah
*Attorney, Agent, or Firm*—Oblon, Spivak, McClelland, Maier & Neustadt, P.C.

[57] ABSTRACT

In the method described, one or more halogen-free phosphorus compounds are incorporated in the precondensed resins before the final resin-curing stage. During final curing, the phosphorus compounds are bound by covalent bonds into the resin structure and/or are trapped in the resin structure as such or in the form of aggregates or condensates.

16 Claims, No Drawings

METHOD FOR MAKING PHENOL-FORMALDEHYDE RESINS FLAME-RESISTANT

The present invention relates to a method for rendering phenol-formaldehyde resin flame-resistant and to products containing such a resin. Particularly, the present invention relates to the use of halogen-free phosphorus compounds for making phenol-formaldehyde resins integrally flame-resistant.

Phenolic resins are employed as raw materials or as auxiliary agents in the form of binders and impregnating agents for the manufacture of a great variety of products.

The preferred fields of application of such resins are in the bonding of derived timber products and the production of molding and coating compositions. Phenolic resins are furthermore employed as binders for the manufacture of inorganic or organic fiber reinforced materials utilized as abrasives or abrasive coatings or as materials for heat insulation and soundproofing. Moreover, applications in the manufacture of resin papers or woven fabrics and in the manufacture of foams of phenolic resins and other construction materials resistant to chemicals are to be mentioned.

The phenol-formaldehyde condensation resins are acid or base catalyzed resins and are employed in the form of precondensed products called "novolak" or "resol" resins. The preparation of said products is described in the chemical standard literature, see, e.g., Ullmann, Enzyklopädie der chemischen Industrie, 2nd edition, vol. 13, pages 453 to 478.

Many products made by using phenol-formaldehyde resins have to meet flammability standard values. For instance, molded parts for the manufacture of cars which are made of non-woven fabrics or masonite boards bonded with phenolic resins must satisfy the inflammability requirements according to DIN 54333 and DIN 75200 as well as US-FMVSS-302.

The requirements to be met by these molded parts and the other materials bonded with phenolic resins mentioned above have, however, steadily increased over the years. For example, hardboards, particle boards and vermiculite boards for special applications such as for structures for fairs should be made flame-resistant according to construction material class B 1. While the requirements for being categorized in construction material class B 1 may be met by means of additives which are conventional in the plastics industry, said additives show certain disadvantages.

Presently materials showing various chemical characteristics are employed for providing flame-retardance. The most important examples thereof are aluminum hydroxide, aluminum sulfate, ammonium phosphate and polyphosphate, melamine borate, antimony oxide, red phosphorus and several halogen compounds, said compounds being added to the products of phenolic resins as additives in an additional operation.

If aluminum hydroxide is to meet the requirements with respect to flame-retardance, it must be added to the phenol-formaldehyde resin in a concentration of up to 50% by weight, resulting, however, in a substantial alteration of the physical properties of, e.g., hardboards.

Flame-proofing agents such as ammonium phosphate and sulfate are water-soluble and may thus be leached out of said materials and final products, respectively. Ammonium sulfate dissolved in molded parts based on woven fabrics may additionally cause corrosion.

The use of ammonium polyphosphate causes problems regarding its uniform distribution in the phenolic resin which in turn results in unsatisfactory materials bonded with phenolic resins. The required construction material class B 1 cannot be achieved with borates. Melamine borate may, however, be employed as partial component for preventing afterglowing.

The employment of halogen compounds and of antimony oxide is undesirable in environmental respect. Red phosphorus as flame-proofing agent leads to problems in the handling thereof.

From J. W. Lyons, "The Chemistry and Uses of Fire Retardants", 1970, pages 417–418, it is known to react phosphorus ester chlorides with phenolic bodies in order to make phenol-formaldehyde resins flame-resistant. Said reaction proceeds under elimination of HCl gas and is thus only applicable to novolak resins. Resins of the resol-type cannot be rendered flame-resistant thereby since the liberated HCl gas adversely affects or destroys, respectively, the basic catalyst system necessary for the production of said resins. Furthermore, the reaction with phosphorus ester chlorides leads to severe corrosion of the equipment. Moreover, the use of novolak resins thus rendered flame-resistant is limited by their high content of halides (particularly in cases where additionally halogenated phosphorus compounds are employed). Particularly, in the case of a fire large amounts of hydrogen halide gas are liberated.

It has now surprisingly been found that materials based on phenol-formaldehyde resins may directly be rendered flame-resistant if halogen-free phosphorus compounds (which preferably are acidic) are added to the precondensed phenol-formaldehyde resin at any time prior to the processing (curing) thereof for forming the final product. Thereby the hydrogen-free phosphorus compounds are distributed homogeneously in the precondensed resin and during the further processing and application, respectively, of the latter said compounds become an integral, insoluble component of the resin compositions.

According to the present invention particular advantages are afforded when base-catalyzed phenol-formaldehyde resins are employed since with the present flame-proofing system hydrogen halide gases will not be released. Furthermore the flame-proofing system according to the present invention does not cause corrosion during the processing of said resins or in the case of fire.

The present invention provides a method for making phenolformaldehyde resin and products containing said resin flame-resistant, which method is characterized in that one or more halogen-free phosphorus compounds are incorporated in the precondensed resin prior to the (final) curing thereof, said halogen-free phosphorus compounds being bonded to the resin structure through covalent linkages and/or being occluded (trapped) within said resin structure, as such or in the form of aggregates or condensates, during the further processing (curing) of the resin.

Particularly suitable as halogen-free phosphorus compounds are (acidic) compounds derived from oxygen-containing compounds of the preferably pentavalent phosphorus, especially phosphoric and phosphonic acid compounds.

Specific examples of phosphoric and phosphonic acids are ortho-, pyro-, tri- and polyphosphonic acids (preferably polyphosphoric acids) as well as phosphonic acids having preferably 1 to 20 and particularly 1 to 10 carbon atoms such as, e.g., methane phosphonic acid, hydroxyethane diphosphonic acid, 3-aminopropane phosphonic acid, 5-diethylene tri-aminopentane phosphonic acid, 4-ethylene diaminobutane phosphonic acid, morpholinomethane diphosphonic acid and 2-phosphonobutane-1,2,4-tricarboxylic acid.

Preferred compounds to be reacted with the above oxygen-containing compounds of phosphorus, particularly with said phosphoric and phosphonic acids, are hydroxyl group-containing carbon compounds which are capable of reacting with said phosphorus compounds to form P—O—C— bonds, such as, e.g., alcohols, phenols and carboxylic acids.

The simplest and most preferred compounds of said class of compounds are alcohols and phenols which preferably are polyhydric. The alcohols may be both aliphatic and cycloaliphatic, saturated and unsaturated, and generally comprise 2 to 20, particularly 2 to 10 carbon atoms, and 2 to 6, particularly 2 to 4 hydroxyl groups. The aromatic alcohols (phenols) generally have a total number of carbon atoms of 6 to 20, particularly 6 to 10 and preferably comprise 2 to 4 (particularly 2 or 3) hydroxyl groups directly bonded to the aromatic system. Preferably said alcohols and phenols each form one or two P—O—C bridges with the phosphorus compound.

Specific and preferred examples of the above alcohols are ethylene glycol, glycerol, 1,2- and 1,3-propanediol, trimethylolpropane, 1,4-butanediol, 1,2,6-hexanetriol, pentaerythritol, cyclohexanediol, meso-inositol, 1,4-dihydroxymethyl-2,5-dihydroxybenzene, pyrocatechol and resorcinol.

The polyhydric alcohols may be employed either alone or as mixture of two or more compounds and/or in admixture with monohydric alcohols. Preferably the corresponding final product (e.g. the ester of phosphoric acid or phosphonic acid, respectively) comprises at least one free hydroxyl group bonded to phosphorus (and preferably also at least one free hydroxyl group bonded to carbon).

Reaction products which belong to the class of compounds described above and are particularly preferred according to the present invention are compounds derived from aromatic polyols (particularly diphenols) with polyphosphoric acid or the phosphorus-derived acids mentioned above since during the processing of the precondensed resins the flame-proofing system is directly incorporated in the structure of the cured phenol-formaldehyde resins.

Another preferred class of compounds which according to the present invention can be employed as halogen-free phosphorus compounds are heteropoly acids of phosphorus, particularly those which in addition to phosphorus comprise silicon, molybdenum and/or tungsten, as well as salts of said heteropoly acids, preferably ammonium salts. Specific examples thereof are silicophosphoric acid, molybdenophosphoric acid and tungstophosphoric acid.

According to the present invention it has furthermore been found that all of the compounds mentioned above exert a particularly favorable influence on the flame-resistance of the final products if they additionally contain nitrogen. In this context compounds derived from nitrogen-containing phosphonic acids (e.g. those mentioned above) are to be particularly mentioned.

A further class of halogen-free phosphorus compounds which may be employed according to the present invention are (metal) salts of phosphorus-containing acids. In this context salts of oxygen-containing acids of phosphorus (particularly of phosphoric and phosphonic acids) with trivalent cations (particularly selected from cations of aluminum, iron and chromium) and the stannous and stannic salts of said acids are preferred according to the present invention. Specific examples of said salts particularly are the phosphates of the elements just mentioned.

According to the present invention it is possible to employ both individual halogen-free phosphorus compounds and mixtures of said compounds. Preferably corresponding mixtures are predominantly (e.g. at least 75% by weight) composed of organic phosphorus compounds (e.g. esters).

According to the present invention the flame-resistance of the final products is determined in the first place by their phosphorus content, based on the amount of phenolic resin. Usually the phosphorus compounds employed according to the present invention are used in amounts which result in a phosphorus content of the resin made flame-resistant of from 0.5 to 15% by weight. Particularly preferred is a phosphorus content of from 1 to 12% and particularly from 2 to 8% by weight.

Naturally, the phosphorus compounds employable according to the present invention show varying phosphorus concentrations. With salts of phosphoric acid the phosphorus content is generally about 20 to 29% by weight whereas with organic phosphorus compounds a phosphorus content ranging from about 12 to 29% by weight will generally be encountered.

The flammability of the materials processed with the phenolic resin having been rendered flame-resistant according to the present invention such as, e.g., wood, paper, non-woven fabrics, mineral fibers etc. also influences the flame-resistance of the final product.

The molecular structure of the phosphorus compounds employed according to the present invention also exerts an influence on the flame-resistance of the final products. Thus it has been found, e.g., that phosphorus compounds containing P-0H groups, due to said acidic group contained in the molecule, dehydrate oxygen-containing organic compounds more rapidly and more efficiently. This is particularly true for esters of phosphoric acid which are formed from polyhydric alcohols and tend to develop ring structures. Furthermore, as already mentioned above, e.g., phosphorus compounds which have been made from nitrogen-containing phosphonic acids show a higher degree of flame-proofing capacity than the corresponding phosphorus compounds free of nitrogen at the same phosphorus content.

The inorganic phosphorus compounds (particularly salts of phosphoric acid) result in the formation of non-flammable skeleton structures which exhibit a flame-proofing effect.

The phosphorus compounds employed according to the present invention are uniformly distributed in the precondensed phenol-formaldehyde resins as component of the mixture and subsequently are firmly incorporated in the resin structure during the processing of said resins, whereby a flame protection which is integrated in the resin is achieved and is effective as flame-proofing coating on the materials of phenolic resin.

As compared to the state of the art a series of advantages is achieved thereby:

The incorporation of the flame-proofing component is carried out concurrently with the processing of the phenolic resin. Thus an additional operation for the application of the flame-proofing system is not necessary. The properties of the manufactured materials are not substantially altered thereby, with the exception of the burning behaviour.

The flame-proofing component is fixed (chemically and/or physically) and cannot be leached out. This makes the fire protection permanent. Furthermore possible corrosion-related influences on other materials as well as subsequent environmentally important events are eliminated, particularly due to the absence of halogen.

In contrast to the known neutral tertiary aryl esters such as, e.g., triphenyl phosphate and tricresyl phosphate, which are highly toxic the acidic phosphorus compounds preferably employed according to the present invention are characterized by a low volatility in combination with a minimum toxicity.

Additionally, in specific cases the use of further condensation catalysts may be dispensed with when using the phosphorus compounds employed according to the present invention.

The use of the halogen-free phosphorus compounds according to the present invention for making phenol-formaldehyde resins or the products made by using said phenol-formaldehyde resins flame-resistant is simple and may be carried out, e.g., by admixing the halogen-free phosphorus compounds with the precondensed resins. The mixing technique to be employed for said purpose is determined by the type of resin and the other materials which are to be combined with said resin and are necessary for the manufacture of the specific final products such as, e.g., particle boards, insulating boards and molding compositions.

In the processing of phenol-formaldehyde resins for making molding compositions the halogen-free phosphorus compounds are preferably incorporated in said molding compositions homogenously during the production of the slugs, along with the flammable fillers such as, e.g., wood flour, wood pulp, textiles etc., in a kneading device or any other compulsory mixer. A similar technique is preferably employed when powderous resins are to be made flame-resistant.

When making low molecular weight resols flame-resistant the halogen-free phosphorus compounds are suitably stirred into the viscous resin matrix so as to form a single phase mixture of phenol-formaldehyde resin and halogen-free phosphorus compound. The preparation of the mixture is preferably carried out shortly or immediately before the resols are used.

The selection of a halogen-free phosphorus compound for a specific purpose is determined by the intended use of the phenol-formaldehyde resin. In the case of particle boards as intended final products it is preferred to employ products based on polyphosphoric acid, pentaerythritol and other aliphatic polyols in combination with inorganic phosphorus compounds (e.g. the salts mentioned above). In the case of non-woven fabrics it may be appropriate to employ only the former products.

In the manufacture of insulating boards the addition of inorganic phosphates, particularly tin(IV)-phosphate, has proven to be particularly advantageous. The non-woven fabrics may be coated by spraying thereon the viscous precondensed resins which have been rendered flame-resistant. Thus it is desirable for the inorganic phosphates to be present in a particle size which does not adversely affect the application by spraying due to plugging of the nozzle. Therefore the particle size of the halogen-free phosphorus compounds will generally be less than 100 μm.

The following examples serve to further illustrate the present invention without limiting the scope thereof in any way.

EXAMPLE 1

A phenol-formaldehyde resin of the resol-type was made flame-resistant as follows:

A halogen-free phosphorus compound was prepared by a condensation reaction of phosphoric acid, pentaerythritol and glycerol in a molar ratio of 2:1:1. 100 parts by weight of the precondensed phenol-formaldehyde resin were homogeneously mixed with 30 parts by weight of the phosphorus compound and the mixture was poured into a mold the dimensions whereof were in compliance with standard UL 94 (Underwriters Laboratories).

The test samples prepared by subsequent thermal curing of the resin were rated V-O in the flammability test.

EXAMPLE 2

The mixture of phenol-formaldehyde resin and halogen-free phosphorus compound prepared in example 1 was uniformly applied, in an amount of 55 parts by weight, in 100 parts by weight of wood fibers. By pressing thereof sheet-like structures were obtained. The sheets thus prepared were subjected to a flammability-test according to DIN 4102, part 1, and met the requirements of the construction material class B 1.

EXAMPLE 3

For the manufacture of flame-resistant insulating materials used in the manufacturing of automobiles 100 parts by weight of preprocessed cotton were combined with 45 parts by weight of a flame-resistant mixture of phenol-formaldehyde resin and halogen-free phosphorus compound to form a sheet-like structure. The flame-resistant resin mixture contained 62% by weight of phenol-formaldehyde resin, corresponding to a content of phosphorus compounds of 38% by weight. The phosphorus compounds consisted of a mixture of 75% of aminomethane phosphonic acid ethylene glycolester and 25% of primary tin(IV)phosphate.

According to an internal test procedure of the car manufacturer the required inflammability of the insulating boards was achieved.

We claim:

1. A method of making phenol-formaldehyde resins and products containing said resins flame-resistant, which comprises incorporating one or more halogen-free phosphorus compounds being bonded to the resin structure through covalent bonds or being occluded in the resin structure or both, as such or in the form of aggregates or condensates, upon further processing of the resins, said halogen-free phosphorus compounds being selected from the group consisting of:

a) esters of oxygen-containing acids of phosphorus with hydroxyl-group containing carbon compounds, which esters have at least one free hydroxyl group bonded to phosphorus;

b) heteropoly acids of phosphorus and salts thereof; and c) salts of heteropoly acids of phosphorus with trivalent cations and tin salts of said acids.

2. The method according to claim 1, wherein said oxygen-containing acids of phosphorus are selected from the group consisting of phosphoric acid and phosphonic acid.

3. The method according to claim 2, wherein said phosphoric acids are polyphosphoric acids.

4. The method according to claim 2, wherein said phosphonic acids are $C_1$–$C_{20}$ phosphonic acids.

5. The method according to claim 4, wherein said phosphonic acid, is selected from the group consisting of methane phosphonic acid, hydroxyethane diphosphonic acid, 3-aminopropane phosphonic acid, 5-diethylene triaminopentane phosphonic acid 4-ethylene diaminobutane phosphonic acid, morpholonomethane diphosphonic acid and 2-phosphorobutane-1,2,4-tricarboxylic acid.

6. The method according to claim 1, wherein said hydroxyl group-containing carbon compounds are selected from the group consisting of polyhydric alcohols and polyhydric phenols.

7. The method according to claim 6, wherein said polyhydric alcohols are selected from the group consisting of ethylene glycol, glycerol, 1,2- and 1,3-propanediol, dimethylolpropane, 1,4-butanediol, 1,2,6-hexanetriol, pentaerythritol, cyclohexanediol and meso-inositol.

8. The method according to claim 6, wherein said polyhydric phenols are selected from the group consisting of 1,4-dihydroxymethyl-2,5-dihydroxybenzene, pyrocatechol, resorcinol and mixtures thereof.

9. The method according to claim 1, wherein the heteropoly acids of phosphorus are selected from the group consisting of those of silicon, molybdenum and tungsten.

10. The method according to claim 1, wherein said trivalent cations are selected from the group consisting of Al, Fe and Cr.

11. The method according to claim 1, wherein said halogen-free phosphorus compounds are added to the resins in an amount which results in a phosphorus content of 1 to 12% by weight.

12. The method according to claim 11, wherein said phosphorus content is from 2 to 8% by weight.

13. The method according to claim 1, which further comprises curing said resin.

14. The method according to claim 13, wherein prior to curing the resin, a filler is added.

15. A pre-condensed phenol-formaldehyde resin, obtained by the method of claim 1.

16. A method of producing molding compositions, coating compositions, binders, impregnating agents and adhesives, which comprises incorporating the pre-condensed phenolformaldehyde resins according to claim 15, thereunto during production thereof.

* * * * *